United States Patent
Spickermann et al.

(10) Patent No.: US 11,455,710 B2
(45) Date of Patent: Sep. 27, 2022

(54) DEVICE AND METHOD OF OBJECT DETECTION

(71) Applicant: Oyla, Inc., San Carlos, CA (US)

(72) Inventors: Ralph Spickermann, Redwood City, CA (US); Raghavendra Singh, New Delhi (IN); Srinath Kalluri, Palo Alto, CA (US)

(73) Assignee: Oyla, Inc., San Carlos, CA (US)

( * ) Notice: Subject to any disclaimer, the term of this patent is extended or adjusted under 35 U.S.C. 154(b) by 0 days.

(21) Appl. No.: 17/241,518

(22) Filed: Apr. 27, 2021

(65) Prior Publication Data

US 2021/0334944 A1 Oct. 28, 2021

Related U.S. Application Data

(60) Provisional application No. 63/016,947, filed on Apr. 28, 2020.

(51) Int. Cl.

| | |
|---|---|
| *H04N 5/91* | (2006.01) |
| *G06T 5/50* | (2006.01) |
| *H04N 5/77* | (2006.01) |
| *G06T 5/00* | (2006.01) |
| *G06T 7/521* | (2017.01) |
| *G06K 9/62* | (2022.01) |
| *H04N 5/262* | (2006.01) |

(Continued)

(52) U.S. Cl.
CPC .............. *G06T 5/50* (2013.01); *G01S 17/42* (2013.01); *G01S 17/894* (2020.01); *G06K 9/6288* (2013.01); *G06T 5/005* (2013.01); *G06T 7/521* (2017.01); *G06V 10/20* (2022.01); *H04N 5/2258* (2013.01); *H04N 5/265* (2013.01); *H04N 5/2628* (2013.01); *H04N 5/772* (2013.01); *H04N 5/91* (2013.01); *G06T 2207/10024* (2013.01); *G06T 2207/10028* (2013.01); *G06T 2207/20081* (2013.01); *G06T 2207/20084* (2013.01); *G06T 2207/20212* (2013.01)

(58) Field of Classification Search
None
See application file for complete search history.

(56) References Cited

U.S. PATENT DOCUMENTS

2013/0293681 A1* 11/2013 Borowski ............... G01S 17/89
348/46
2017/0243352 A1* 8/2017 Kutliroff ............... G06T 19/006
(Continued)

*Primary Examiner* — Eileen M Adams
(74) *Attorney, Agent, or Firm* — Kim Rubin, Patent Agent

(57) ABSTRACT

A device and method of object detection in a scene by combining traditional 2D visual light imaging such as pixels with 3D data such as a voxel map are described. A single lens directs image light from the scene to a dichroic mirror which then provides light to a both a 2D visible light image sensor and a 3D sensor, such as a time-of-flight sensor that uses a transmitted, modulated IR light beam, which is then synchronously demodulated to determine time of flight as well as 2D coordinates. 2D portions (non-distance) of 3D voxel image data are aligned with the 2D pixel image data such that each is responsive to the same portion of the scene. Embodiments determine true reflectivity, true scale, and image occlusion. 2D images may be enhanced by the 3D true reflectivity. Combined data may be used as training data for object detection and recognition.

19 Claims, 10 Drawing Sheets
(8 of 10 Drawing Sheet(s) Filed in Color)

(51) Int. Cl.
   *H04N 5/265*     (2006.01)
   *G01S 17/894*    (2020.01)
   *G01S 17/42*     (2006.01)
   *H04N 5/225*     (2006.01)
   *G06V 10/20*     (2022.01)

(56) References Cited

U.S. PATENT DOCUMENTS

2019/0220039 A1* 7/2019 Wu ........................ B64C 39/024
2021/0307608 A1* 10/2021 Hu ........................... A61B 3/14

* cited by examiner

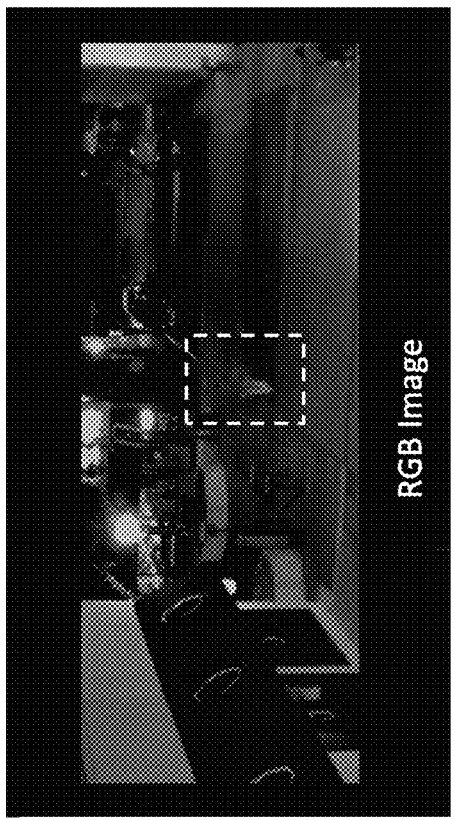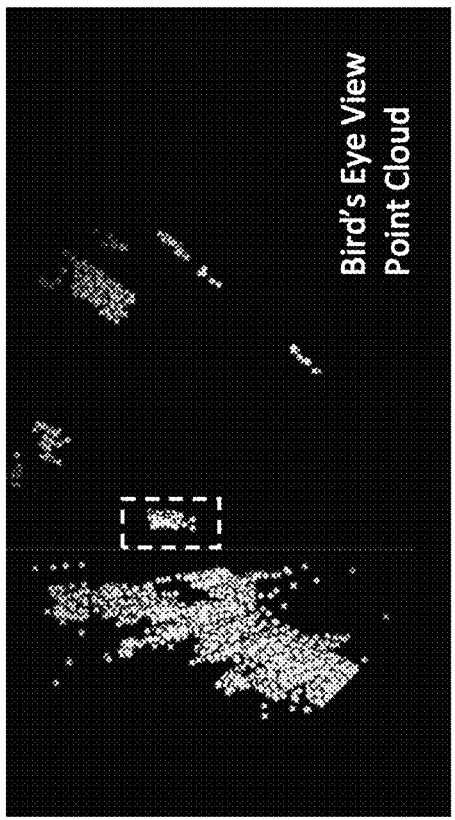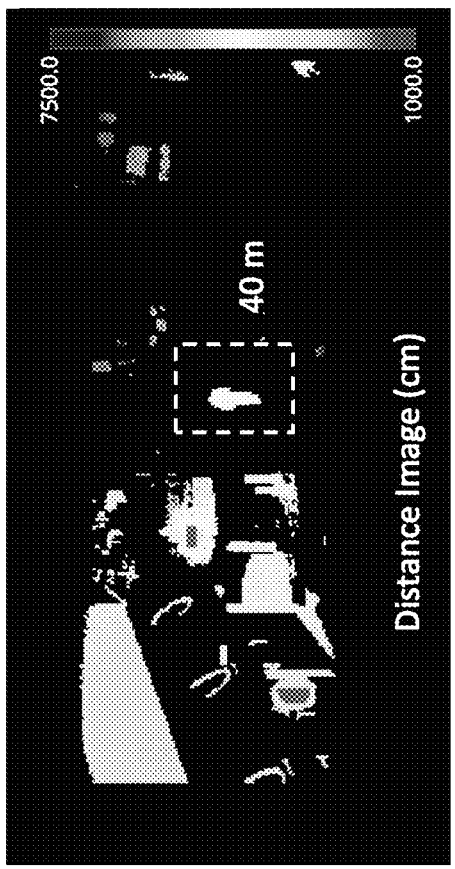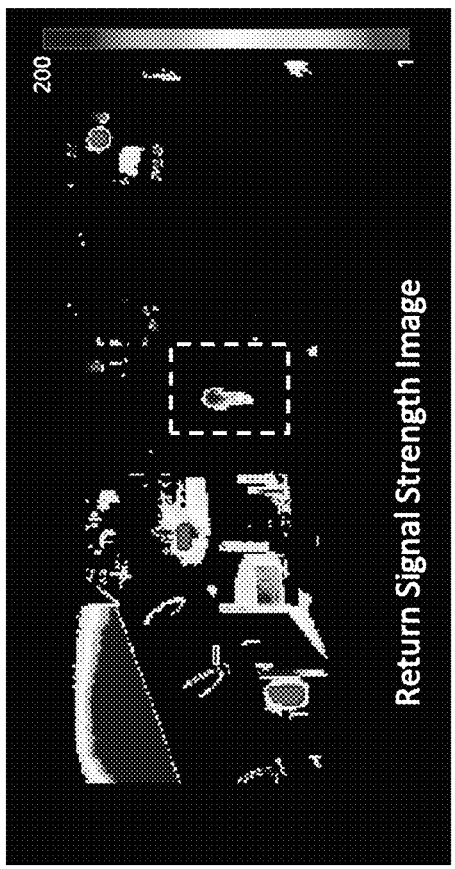
Fig. 3A — Distance Image (cm)
Fig. 3B — RGB Image
Fig. 3C — Return Signal Strength Image
Fig. 3D — Bird's Eye View Point Cloud ○ TOF cameras measure true reflectivity of objects (RGB cannot)
○ Replace RGB reflectivity with TOF reflectivity if it is larger – enhances dim objects 60% increase in YOLO detection rate in dim light

DEVICE AND METHOD OF OBJECT DETECTION

FIELD OF THE INVENTION

This invention is in the field of object detection, such as by the use of cameras and LIDAR for security, surveillance, vehicle safety, autonomous vehicles and the like. Applications may be fixed or mobile.

BACKGROUND OF THE INVENTION

Automated object detection is critical in applications such as surveillance, security and autonomous vehicles. Given an actual scene, such as a pedestrian walking on a street, there are multiple ways to capture some of that physical reality and turn it into digital data. The most common is by the use of a camera, either creating still images or video such as a sequence of still images. We refer to these types of images a "2D." Representation is typically a set of pixels where each pixel has an identifiable location on two orthogonal axes, typically identified as x and y. Another method of capturing scene data is by the use of LIDAR, which by timing the reflection of light, creates a set of 3D points, or voxels, called a point cloud. The location of voxels required three scalars, such as x, y, and z. Other coordinate systems may be used, such as azimuth, altitude and distance. Mathematical transforms from one coordinate system to another are well known. In general we refer to these as "3D." Most generally, 2D may be thought of as a conventional camera image of a region identified by a field of view, with image data representing a continuous image. 3D data from LIDAR and other ranging technologies is typically a point cloud of voxels. There are commonly gaps between the points.

Each technology has strengths and weaknesses. 3D provides true distance and true reflectivity. However, limitations include a maximum range, gaps, low resolution, a low frame rate, and often a poor signal-to-noise ratio.

Automated image recognition using 2D images and artificial intelligence (AI) is an advanced field. Typically, an AI system looks at a "training set" of images with previously identified objects, such as a car, bicycle or pedestrian. With a large enough and properly identified training set, the trained AI system will be able to identify objects in new images with some level of accuracy. Levels of accuracy vary widely and are due to many factors. Mathematical transforms on 2D images are well known, such as correlation, convolution, convolution neural nets, normalization, affine transforms, and the like.

Automated image recognition on 3D point clouds is much less advanced. The point cloud data is particularly challenging for AI systems. Comprehensive training sets do not yet exist and there are no well-known, cost-effective technologies for creating them. Working with 3D point clouds is computationally expensive. The low resolution, missing data and poor signal-to-noise make real-world object recognition particularly challenging.

Some systems use both 2D and 3D imaging hardware to digitally capture a scene. A major challenge with this approach is that prior art 2D and 3D imaging hardware does not look at exactly the same scene. Calibrating 3D data to properly overlay with a 2D image is particularly challenging. In any case, it is computationally expensive. The required distortion will alter at least one of the resulting images.

SUMMARY OF THE INVENTION

This invention overcomes weaknesses of the prior art. Two images of a scene are captured at the same time: a 2D image from a camera and a 3D point cloud from a 3D "time-of-flight" (TOF) sensor. They are simultaneous, distinct images of the same scene, because only a single, shared, focusing optics is used. A dichroic mirror splits the incoming light towards both a 2D sensor and a 3D sensor. In this way, the two images are inherently aligned. No complex, slow and non-ideal calibration or overlay of images is necessary.

Selected portions of the 3D data are then used to "enhance" the 2D image. There are numerous forms of encoding 2D imagery, such as JPEG, GIF, and the like. We generally refer to 2D as being "RGB," without further reference to various file formats. We refer herein to any RGB image enhanced by the use of a simultaneous, inherently aligned 3D data as an e-RGB image. A typical output of embodiments is an e-RGB image. Note that this output is effectively a 2D image. It may be stored, communicated, displayed and processed just like a traditional 2D image of a scene. It may be used in an AI training set or used as input to a trained AI system for the purpose of object identification in the scene.

Different embodiments use different methods to enhance the raw RGB image from the 3D dataset, into an e-RGB image. Before discussing specific embodiments, we need to point out specific weaknesses of an RGB image captured with a conventional camera. First, the relative brightness and color of a portion of an object in the scene is not "true." For example, a portion of a scene may be in sunlight and a portion in shadow. The pixels from the shadow area will be much darker than pixels in a sunny area, even though the objects have identical color and brightness. Similarly, reflections can easily produce artifacts. For example, a glass window will often show a reflection far brighter than whatever is behind the window. Reflections from glass onto an object can also change its apparent brightness and color. Additionally, a conventional 2D image has no ability to incorporate distance or range. A dog may appear small either because it is a small dog or because it is far away. No matter how clear the image of the dog is, without additional information there is no way to tell the size of the animal. A 2D image cannot inherently tell the difference between looking at a real thing, such as a car, with a picture of a car, such as may be on a billboard. We refer to "true reflectivity" as the actual brightness of a portion of an object based solely on fixed characteristics of the object, independent of how it is momentarily illuminated and independent of its distance. Conventional cameras never identify true reflectivity, only apparent reflectivity. "True scale" refers to the actual size or dimensions of an object. Such true scale does not change based on the distance of the object. "Occlusion" is the apparent overlap of one object with another object in an image. Such occlusion can make object recognition more difficult or it may fail entirely. For example, if two people are wearing orange clothing, and person partially occludes the other person, they may appear only as an orange blob, with a shape that does not recognize as a person.

Use of simultaneous and fully aligned 3D data with 2D data can be used to identify true reflectivity, true scale and image occlusion.

In typical 3D point clouds, there are really four scalars per voxel: two coordinates that correspond to azimuth and altitude, similarly to x and y; distance, that is: time-of-flight; and amplitude. Amplitude is the intensity of a reflected signal for that voxel. It is roughly similar to "brightness" in a conventional 2D image. If the 3D point cloud is displayed as a 2D image, the distance may be shown as a false (or "artificial") color. Generally, amplitude is not shown in such an image. One reason is that the actual signal amplitude varies significantly with distance, and so it would have to be first normalized. A second reason is that even a normalized amplitude is not a good indication of relative brightness of the object due to differences in reflectivity such as diffuse v. specular reflection, mirror effects, and material and texture.

In one embodiment, the range (distance) and signal amplitude, (typically normalized) of voxels may be used to enhance pixels in a corresponding RGB image.

In 3D data, a voxel (or data point) has both a range and amplitude. These, together ("range+amplitude"), are the "true reflectivity" of a spot on an object. The "brightness" of a pixel in a 2D image is a combination of many factors, such as multiple light sources, surface material, transparency, specular reflections, and the like.

In a 2D image, an object, such as a person, may be indistinguishable from a distant background. However, the 3D data identifies the person distinctly because they are closer than the background. The background may be too far away to be imaged in 3D at all, and so it appears effectively as "black." That is, the background "disappears." Pixels that correspond with black voxels may be turned black, turned off effectively with an alpha channel, or ignored in the 2D image, thus enhancing it. After such enhancement the person may be recognizable as a person to an object recognition algorithm, algorithm step, module, or subsystem.

In a key embodiment, a true reflectivity from a 3D voxel is compared to a brightness of a corresponding 2D pixel, and then the true reflectivity from the 3D data is substituted for the brightness in the 2D image under a defined condition, such as "being brighter," noting that normalization and offsets are typically included in such comparison or substitution. Noise reduction, averaging, error checking or any of a number of image processing filters may also be used.

In another embodiment, true scale is achieved by the use of range information in the 3D voxels. A portion of an image may look like a dog in a 2D image to an AI algorithm. However, with the addition of range information the dog is now too large to be a dog, and may in fact be a portion of a much closer automobile. The use of true scale allows image recognition algorithms to include size of the object as data to be considered. For example, the height of adults falls within a relatively narrow range of size. Similarly, the size of most automobiles falls with a relatively narrow range. The size of some important objects, such as stop signs, is well known. With true scale, recognition of a stop sign is more accurate by AI algorithms. True scale in embodiments may be added to traditional AI algorithms at many different levels. For example, input patterns in training could be distinguished by depth. Or, different candidates at output could be distinguished by depth. Not all embodiments include such features.

Correction of image occlusion may occur by noticing that a single blob, such as the orange blob mentioned above, is really two distinct objects at two distinct distance. By ignoring pixels that correspond with the more distant object, the blob may now be reduced to a recognizable shape of a person. Separating blobs into separate elements based on distance may be called, "resolving occlusion." This is achievable by modifying or enhancing the 2D image data to incorporate separate depth planes, that is, distance, from the 3D data.

Embodiments can enhance a 2D image by improving true reflectivity, true scale and identifying object occlusion. Embodiments may include creation of modifications or bounding boxes.

Yet another embodiment allows the generation of a bird's eye view of a scene. Although any 3D point cloud may be presented as a bird's eye view, the discrete nature of the voxels provides a sparse image. Often in such a view, no objects are recognizable. However, such an overhead view may be synthesized by including information from the 2D image, such as color or texture. A low-resolution set of points may be replaced by a standardized image, if an object is identified. For example, if an object is identified as a car, an overhead image of car, generally corresponding to the size and orientation of the identified car, may be substituted or overlaid over the sparse voxels. Color may be added from the 2D image. That is, a red sports car may be identified, and then an overhead view of a red sports car is presented in an overhead view. This capability or embodiment is particularly valuable with respect to moving objects. For example, it may be very hard to tell from consecutive 2D image that a car is moving rapidly directly towards a viewer. However, the distance information from consecutive 3D data sets can readily be used to determine the speed and direction of the car. Even if no overhead view of the scene is directly presented to a person, driver or autonomous vehicle algorithm, a car may be shown or identified as speeding and as a potential risk. We may refer to this as "true motion." In yet another example, pedestrians may be identified if they move into pre-defined exclusion zones.

In yet another embodiment, the inherently calibrated 2D and 3D image data may be used for both an AI training set and as input to an AI algorithm of object recognition and safety/risk determination. That is, it may not be necessary to combine the 2D and 3D data prior to sending them an AI algorithm or other object recognition or object identification module or subsystem.

A core advantage of using inherently calibrated 2D images and 3D data to generate an e-RGB image, is that the e-RGB image may be passed to existing trained AI algorithms, where these have been trained only on conventional (unenhanced) RGB images. We refer to this as "transfer learning," because the learning done during AI training on 2D images may be used on e-RGB images without additional training.

BRIEF DESCRIPTION OF THE DRAWINGS

The patent or application file contains at least one drawings executed in color. Copies of this patent or patent application publication with color drawing(s) will be provided by the Office upon request and payment of the necessary fee.

FIGS. 3A, 3B, 3C and 3D show, for a single scene, an image from 3D distance data; raw 2D image; an image from 3D amplitude data; and a bird's eye point cloud from the 3D data, respectively.

DETAILED DESCRIPTION OF THE INVENTION

Embodiments, examples, drawings and scenarios are non-limiting.

Figure 1:
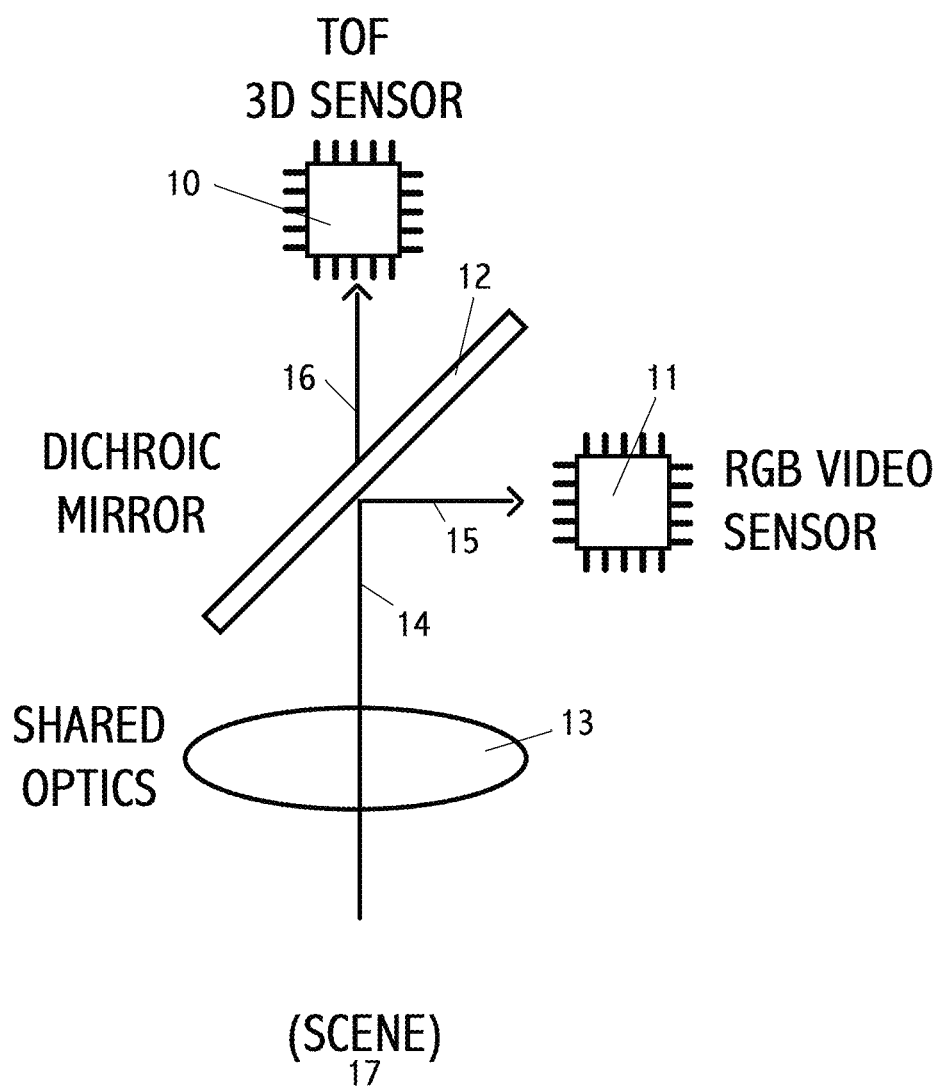
FIG. 1 shows a simplified view of hardware comprising a dichroic mirror, shared optics, and 2D and 3D sensors.

Turning first to FIG. 1, we see a schematic view of a single, shared, optical path through focus lens(es) 13, a dichroic mirror or prism 12 that separates the light 14 from the shared optics 13 into two paths, where one path 15 is to a 2D imaging sensor(s) 11 and a second path 16 is to a 3D imaging sensor(s) 10, such as a time-of-flight sensor. A scene 17 as observed by both sensors 10 and 11 is inherently aligned between the two sensors, due to the shared optics 13. Note that use of a time-of-flight sensor requires outgoing light to illuminate a scene. Such a light source is not part of all claims, but is part of some claims. Use of a local light source such as a lamp (e.g. headlights), or ambient lighting such as by sunlight or streetlights is not part of all claims, but is part of some claims. The term, "shared," refers to the architecture where a 2D sensor (e.g., "RGB") and a 3D sensor (e.g., TOF sensor) share a single set of optics. Such optical element sharing results in inherently aligned 2D and 3D images.

Figure 2A:
FIGS. 2A, 2B, and 2C show, for a single scene, a raw 2D image; a raw 3D image data; and a resulting enhanced e-RGB image, respectively.
Figure 2B:
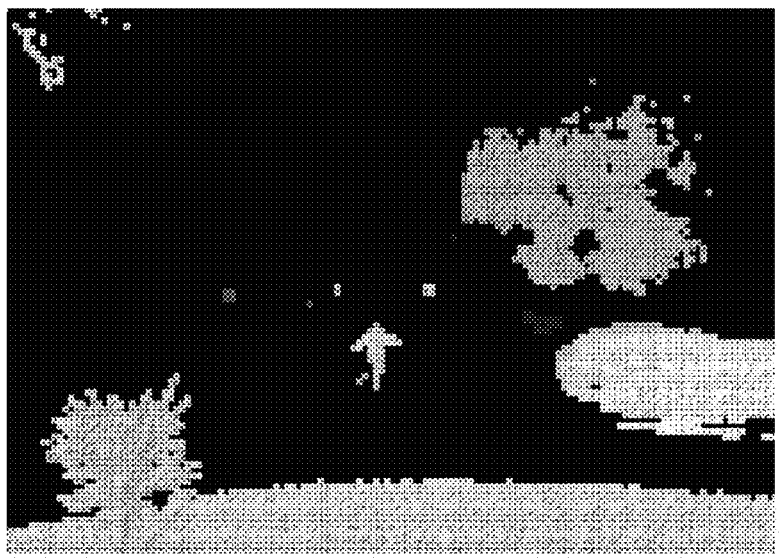
Figure 2C:

Turning now to FIGS. 2A, 2B and 2C, we see three images as part of an embodiment to produce a superior 2D image, called an e-RGB image, by algorithmically combining both a 2D image and 3D data from their corresponding two sensors. FIG. 2A shows a "raw" image from a 2D image sensor, here, at night. No person is visible to either a human or an automated object detection algorithm, such as an AI algorithm trained on similar, 2D images. FIG. 2B shows a representation of the same image, false color coded by distance as measured by the 3D imager, such as a time-of-flight sensor. A recognizable, human-shaped object is near the center of the image. FIG. 2C shows a merged image, "e-RGB," where the pixels that are brighter in FIG. 2B are substituted into the image in FIG. 2A when the respective pixels are brighter. Note that the person near the center of the image in FIG. 2C is now readily visible. Note also that the tree in the lower left has been brightened from dark against the background to light against the background. Also note that amorphous regions upper right and mid right have also been brightened. Yet, the image as a whole is similar to FIG. 2A. This is important because an AI algorithm trained on images similar to FIG. 2A may be used, without modification or retraining, on images such as 2C. This permits applications and embodiments to immediately take advantage of existing training sets and trained AI algorithms.

Note that a person is partially visible at 40 meters, as identified by a bounding box in FIG. 2C. Generally, these pixels could not be identified by a person or a machine object recognizer from the 2D image alone. FIG. 2B shows the same scene at the same time, now from the 3D sensor. Pixels representing the person are clearly visible. In one enhancement, the pixels (from the voxels) in the 3D data are substituted or used to increase the brightness of corresponding pixels in FIG. 2C. The result, called an e-RGB image, is shown in FIG. 2C. This image is now suitable to pass to a 2D image object recognition and identification subsystem. Here a bounding box around the person has been added automatically. Images in FIGS. 2A, and 2B are real images of real scenes. The white bounding box in FIG. 2C shows the result of an existing, trained AI network properly identifying the person, which it could not do for image FIG. 2A. This network was trained on RGB street scenes, not on any 3D data. The ability to enhance RGB images (FIG. 2A) using 3D data (FIG. 3B) to create an image that is useable to existing 2D-only-trained AI (FIG. 2C) is clear. This is a critical difference and improvement of the prior art.

Turning now of FIGS. 3A, 3B, 3C and 3D, we see, for a single scene, at a single exposure in time, four images. FIG. 3B shows a "raw" image from the 2D image sensor. A dotted box identifies an object, although it does not look like a human. FIG. 3A, an image is shown using distance data in false color (distance scale at right side of image) from a 3D data sensor. Here an isolated object at about 40 meters is clearly visible inside a dotted box. FIG. 3C is also from the same 3D data, but is now shown in false color based on signal amplitude, again in a dotted box. FIG. 3D shows a synthesized "bird's eye view." Comparing FIGS. 3A with 3B, for example, it is easy to see how person in the 3D distance data is far more visible than in the RGB image. The scene as a whole is identifiable as a street scene in FIG. 3B. Without training, most people and algorithms would have a hard time recognizing FIG. 3A as a street scene.

Figure 4C:
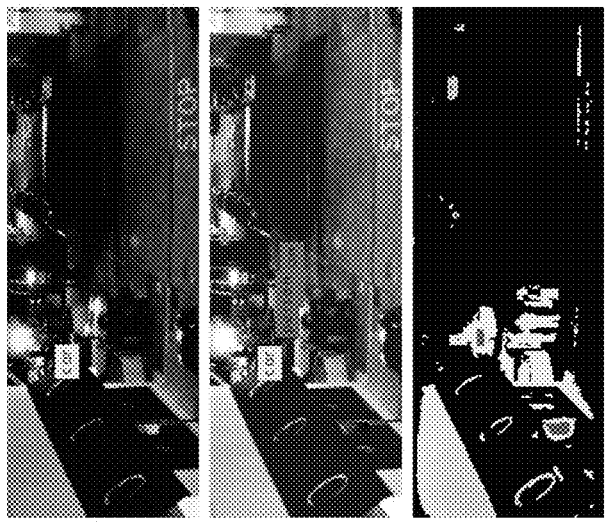
FIGS. 4A, 4B and 4C shows three exemplary scenes. Each scene has three images: the raw 2D image top, the raw 3D data bottom, and the enhanced e-RGB image center.
Figure 4B:
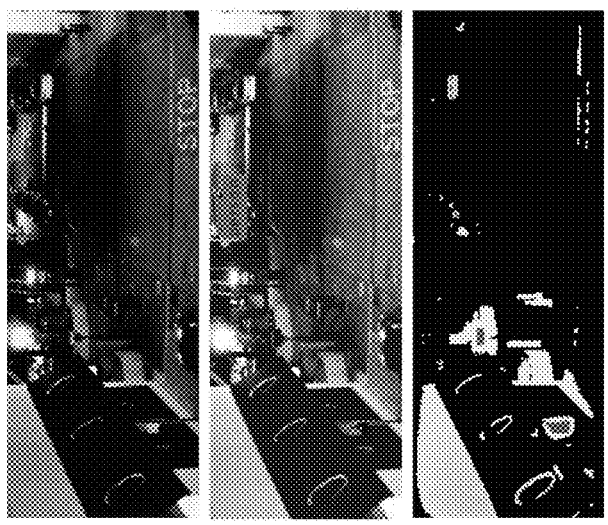
Figure 4A:
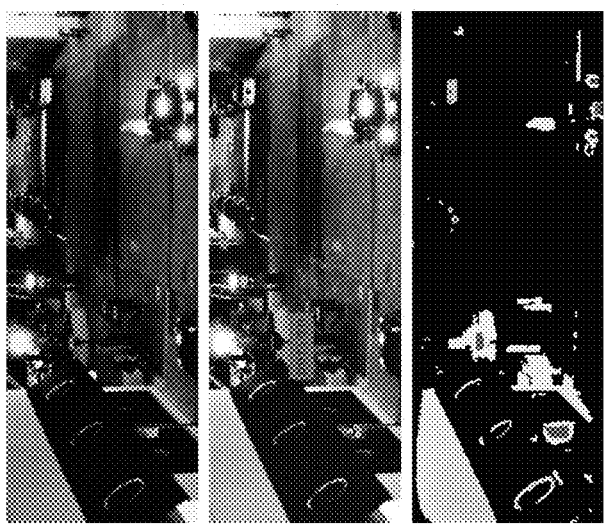

Turning now to FIGS. 4A, 4B and 4C, we see three distinct scenes. Each scene is shown three ways: the RGB image is at the top; the 3D data with distance as false color is at the bottom; and a hybrid, "e-RGB" enhanced image created from the top image and bottom data is shown in the center. Labels, such as "car" and "person" are shown in yellow and magenta, in the center images. These labeled elements have been so identified automatically by an existing 2D-only-trained AI network. In FIG. 4C, multiple people have been identified. The same AI network was applied to the RGB images. Only a car was recognized in FIG. 4C top.

Figure 5A:
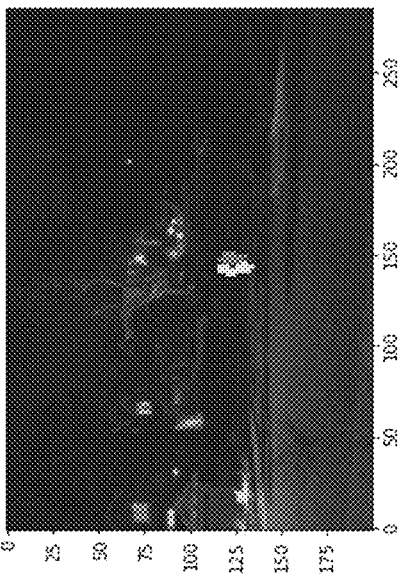
FIGS. 5A, 5B and 5C show a scene before and after embodiments.
Figure 5B:
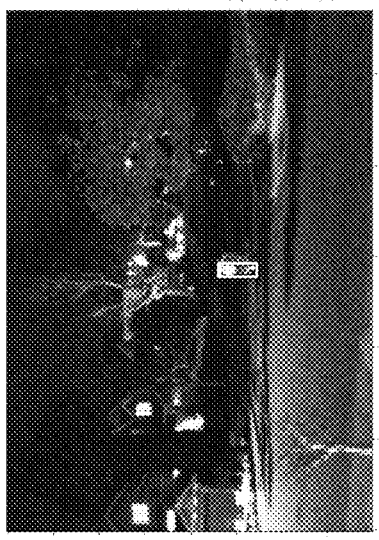
Figure 5C:
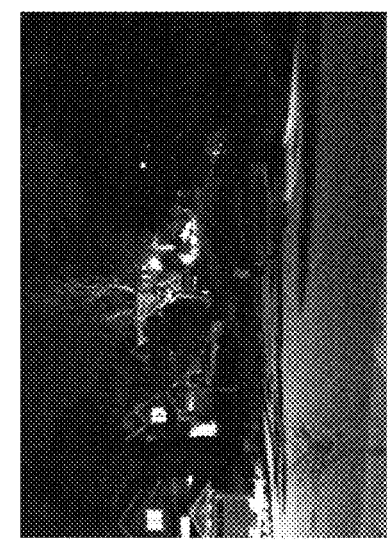

FIGS. 5A, 5B and 5C show additional enhancements in some embodiments. FIG. 5A shows an RGB image. FIG. 5B shows a synthesized e-RGB image, as described above. FIG. 5C shows an image created by the additional enhancement of using distance. Here there are clearly two people because they are at different distances, even though they are close together. We refer to this embodiment image as "e-RGB+D." Labelled objects in the images were recognized automatically by a previously trained AI network trained on 2D images.

Figure 6:
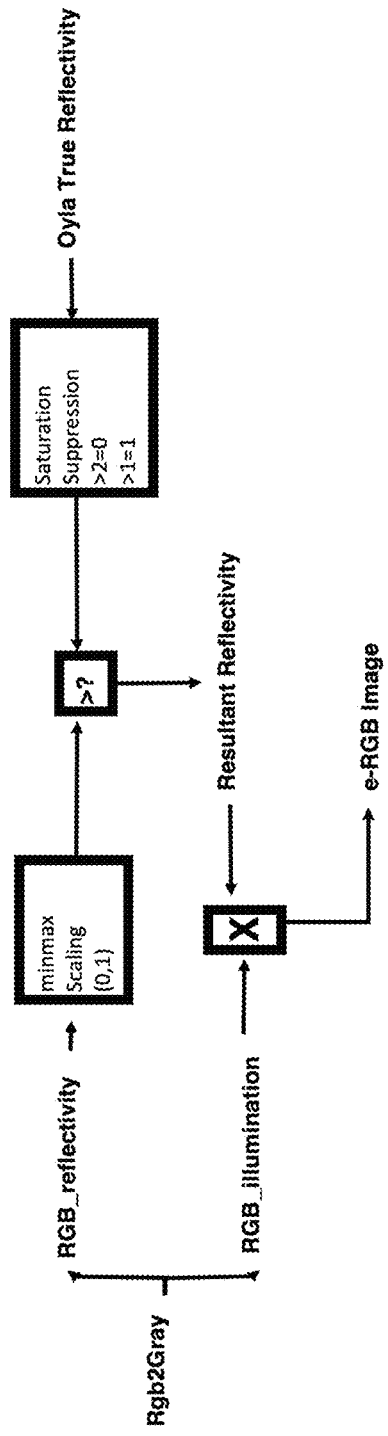
FIG. 6 shows an embodiment of image enhancement.

FIG. 6 shows a simplified block diagram for some embodiments. The RGB data from the 2D image sensor is shown entering from the left. Data from a 3D sensor is shown entering from the right. On a pixel-by-pixel basis, or alternatively using groups of adjacent pixels, the "brightness," or reflectivity, is compared. If the pixels from the 3D data are brighter (some combination of distance and signal amplitude) than the corresponding pixels from the 2D image, they are substituted, as shown in the center of the Figure. Pixels are then recombined (see box labeled "X") to create an e-RGB image.

Figure 7:
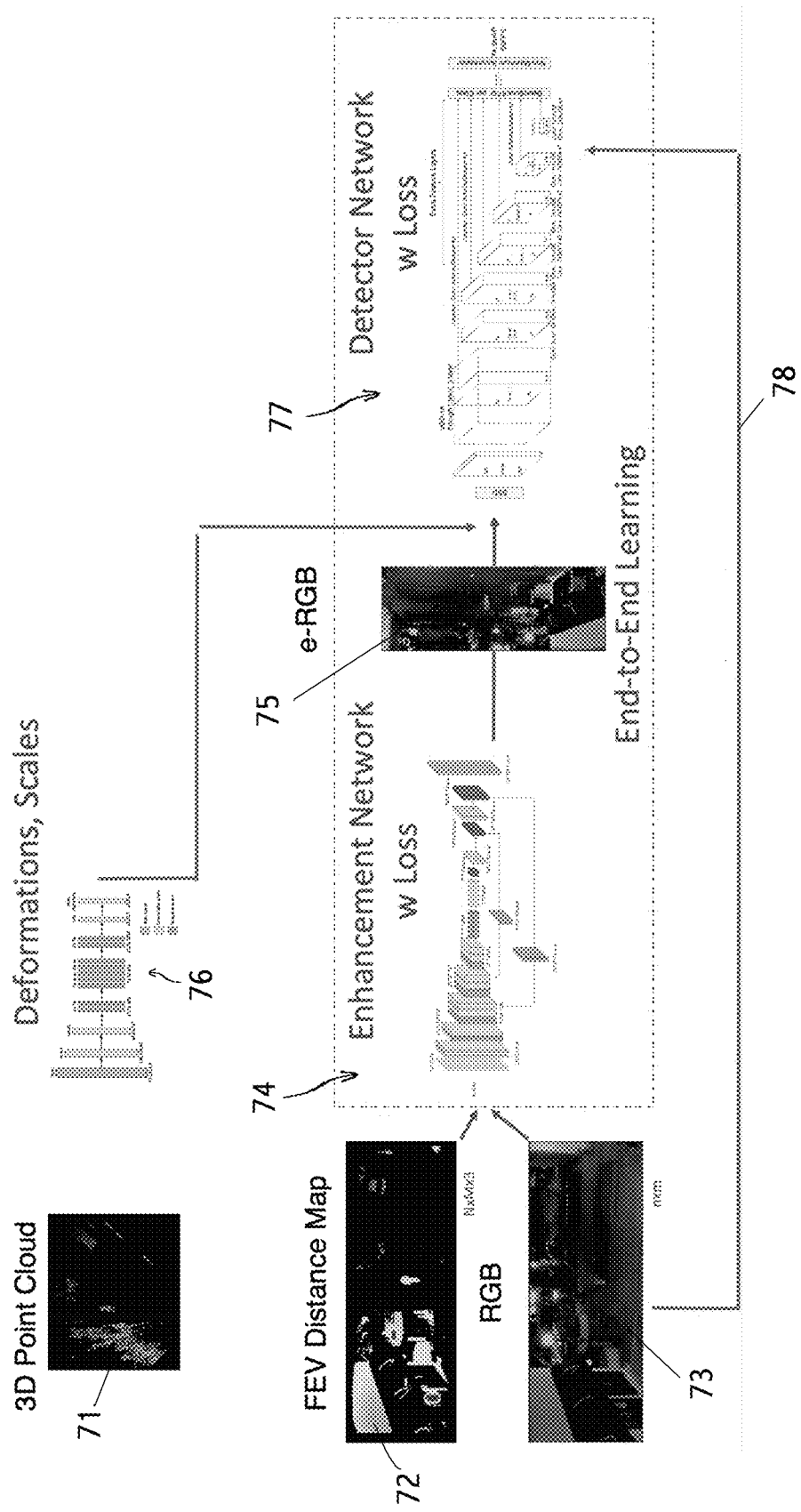
FIG. 7 shows a block diagram of system embodiments.

Turning now to FIG. 7, we see a block diagram of some embodiments. This embodiment may be for an AI network, either for training or for use after training. Here we see both the RGB 2D image 73 and 3D data 72 entering from the left. The block, "Enhancement Network w/Loss," 74 comprises a sequence of algorithms steps. The result of these steps is a e-RGB image 75 described elsewhere herein. The block, "Deformation and Scaling" 76 show optional image processing steps after the creation of the e-RGB image 75. The block, "Detector Network w/Loss" 77 shows additional image processing steps that maybe used to identify objects. A key novelty over the prior art, which typically uses only this last processing block 77 using 2D image data 73 only, include elements 72, 74, 75, and 76. Path 78 shows prior art.

Figure 8:
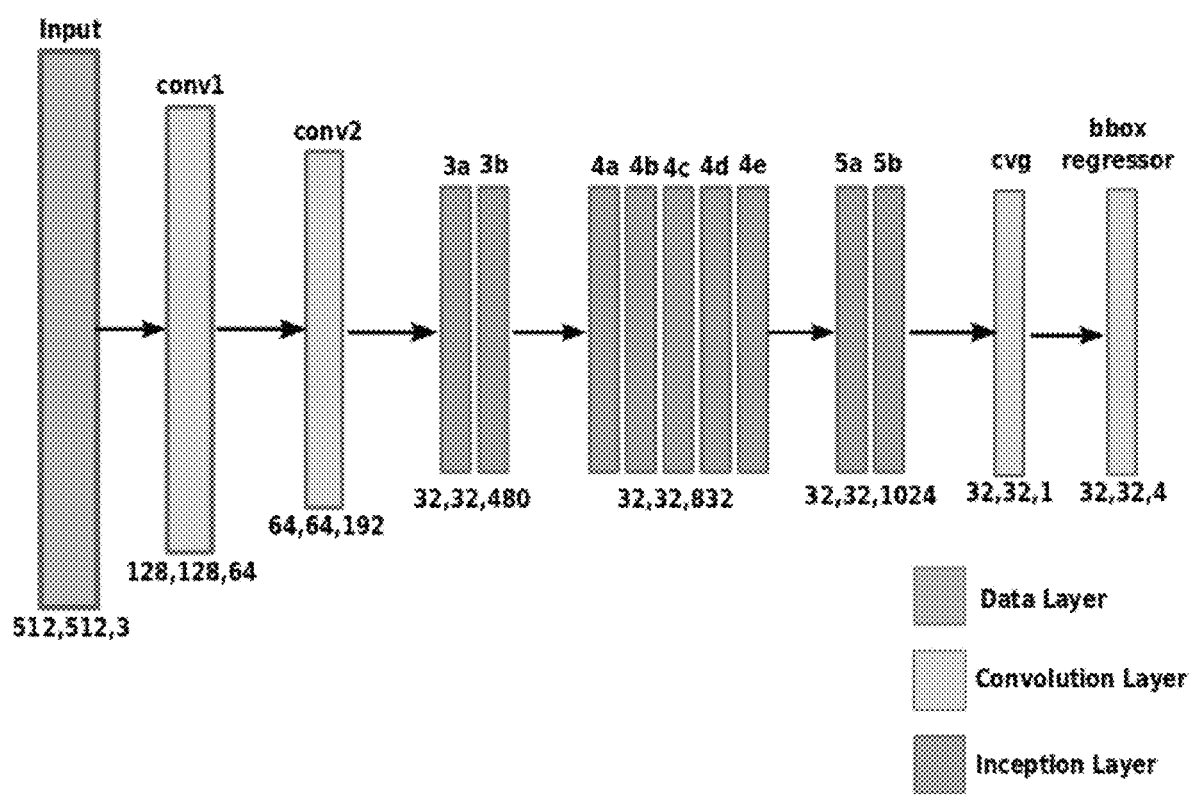
FIG. 8 shows a detail from FIG. 7.

FIG. 8 shows a detailed view of block 76 in FIG. 7.

Figure 9:
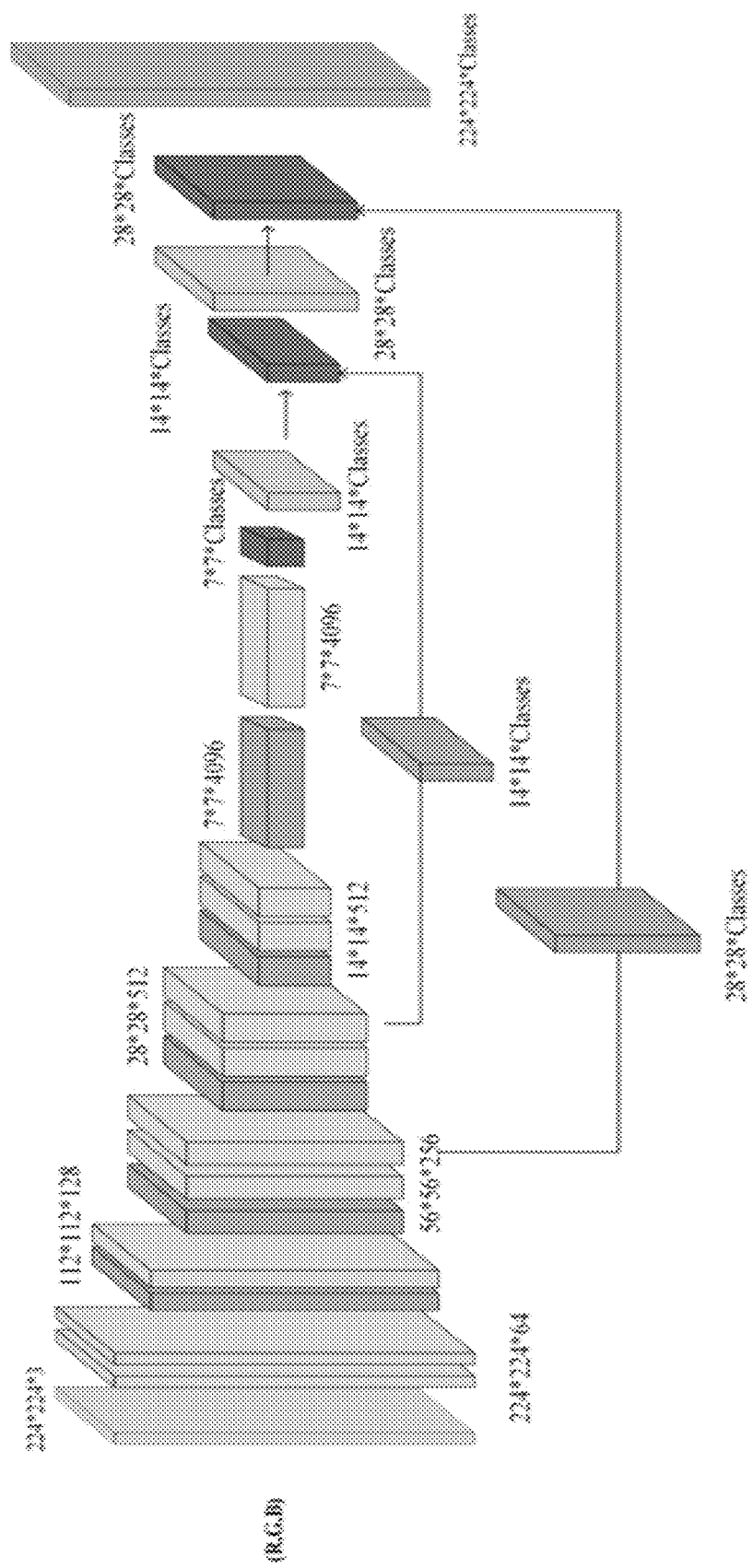
FIG. 9 shows another detail from FIG. 7.

FIG. 9 shows a detailed view of block 74 in FIG. 7.

Figure 10:
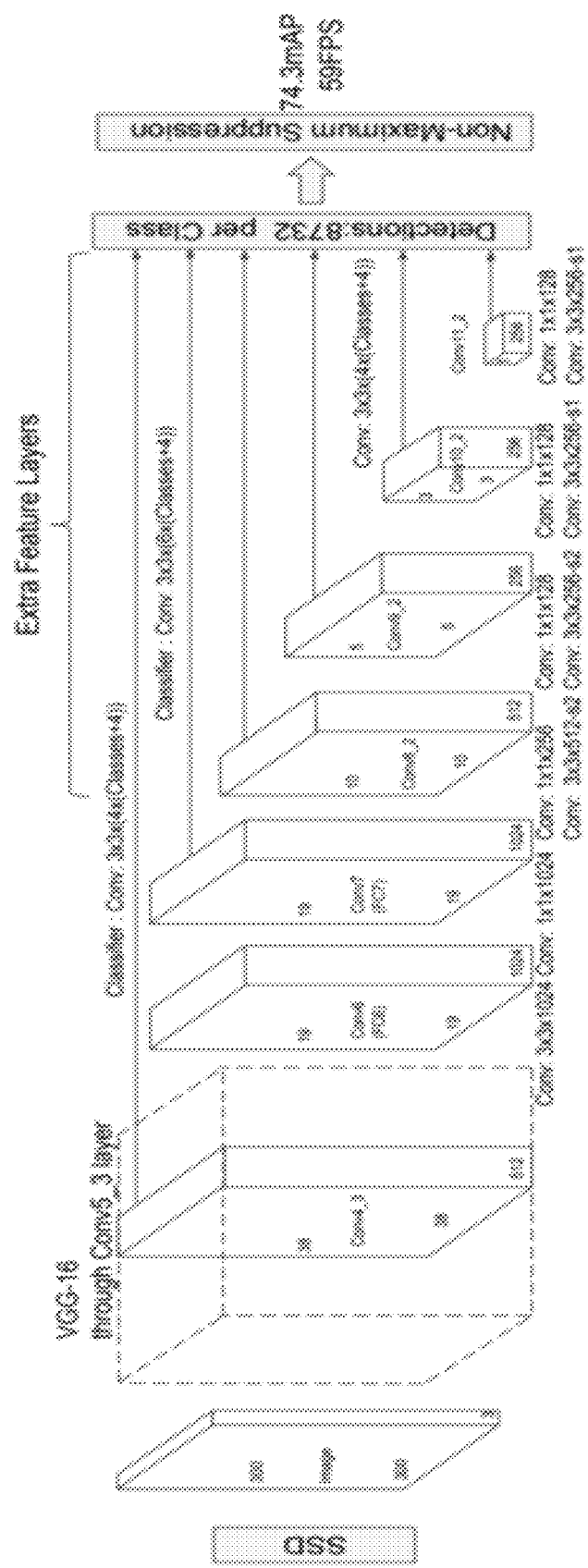
FIG. 10 shows yet another detail from FIG. 7.

FIG. 10 shows a detailed view of block 77 in FIG. 7.

One embodiment uses distance from the 3D data to separate portions of the 2D image into foreground and background portions. Colors or brightness of either foreground or background portions may be altered from the 2D image to the e-RGB image. For example, background portions—those beyond a certain distance, may be turned black.

Another embodiment replaces brightness of portions of a 2D image with brightness as determined by true reflectivity in corresponding portions of the 3D data to generate an e-RGB image. Typically, this is used to "brighten" dim objects, such as a person who is not well lit or wearing dark clothing. However it may also be used darken regions, such as regions that are beyond a certain distance. For example, distant headlights may produce bright spots on a 2D image, yet no corresponding object is detected in the 3D data. The bright spots from the headlights may be eliminated from the 2D image for the e-RGB image.

Yet another embodiment enhances color or contrast of portions of the 2D image based on distance from the 3D data, effectively creating a greater distinction between foreground and background in the e-RGB image. Object distinction is improved using contrast and depth.

In one scenario, a scene includes multiple cars, some of which are occluding other cars. This scene is too complex, and with only portions of cars visible, and overlapping, a trained AI network is unable to reliably identify individual cars from the 2D image. The same scene is captured in 3D. Each individual car appears as a closely spaced group of voxels, both spatially and by distance. Bounding boxes are created for the visible portions of individual cars. The regions in the 2D image are separated into multiple sub-images using the bounding boxes. Now, some of the sub-images are recognizable as cars, or other objects, by the same AI network. This is particularly important to determine speed of the cars. In order to measure the speed of a car, the car must first be identified from other portions of the scene. Once a single car has been identified, that car can be tracked over time to determine both its speed and direction (heading).

Even if an object cannot be identified by type, such as a person, car or dog, it may be determined to be an object of interest by its distance. For example, consider a scene with many cars, perhaps slowing to stop at an intersection. A person now walks in front of the cars. Distance and resolution may be such that the person cannot be identified as a distinct object from 2D images alone. The background of moving cars generates a great deal of image noise. Even though the person is moving, because the cars also are moving (even if slowly) the person cannot be identified as a distinct object. However, by using distance data from the 3D data, it is readily determined something is in front of the cars. That thing, which may be no more than a few voxels, is observed as moving by comparing a sequence of 3D frames. This information may be used to enhance the 2D images. For example, all pixels corresponding to the more distant cars may be removed or darkened for the e-RGB image. Then, a pretrained object detection AI network may be able to identify the object as a person. Note that by the use of real distance, the real scale of the object is known. Although only a few pixels in size, it nonetheless meets all the criteria within the object detection module to identify as a person. Note that the processing to generate the e-RGB image may have no idea what cars or people are. Nonetheless, by generating the e-RGB image, pretrained AI is able to identify a person where it could not from the 2D image.

Use of trained AI networks, where the network was trained on different images is called "transfer learning." Claims specifically include using AI networks on e-RGB images where the AI network was trained on unenhanced RGB images.

The terms, "3D data," "3D point cloud," and "voxel point cloud" are generally equivalent unless otherwise stated. The term, "3D image" refers to a viewable image created from corresponding 3D data.

The terms "distance," "range," and "depth" with reference to 3D data or portions of the 3D data, or corresponding portions of an e-RGB image, are generally equivalent unless otherwise stated.

The terms, brightness, true reflectivity, and amplitude are closely related; although the terms are generally applied to only one of a 2D image or a 3D data. However, in embodiments where the 2D image and 3D data are of exactly the same scene, all or parts of the 2D image and the 3D data are combined, terminology from one type of image to another requires expansion of the scope of these terms from the art. For example, "brightness" or "luminosity" are terms generally applied to 2D images. "True reflectivity" and amplitude are terms generally applied to 3D data, or points or voxels within the data. Because the 2D images and 3D data are acquired at the same time and of the same scene, there is a close matching of pixels in the 2D images with points in a point cloud from the 3D data, although there may not be a one-to-one mapping because there may be more pixels in the 2D image than voxels in the 3D point cloud. Additionally, the type of information about a pixel or voxel is different. For example, a 2D image may have five scalars for a pixel: RGB or YUV, and x-position and y-position. A voxel from the a 3D data may have four scalars for a voxel, such as azimuth, elevation, range and amplitude. Azimuth and elevation are readily convertible to x-position and y-position. Thus, it easy to align pixels with voxels. No convolution steps are necessary for alignment. Specifically claimed are image processing and object identification methods, devices and systems free of alignment convolution steps.

An "imager" may be a single chip or an array of chips.

Although we sometimes refer to 2D images as "RGB" or "e-RGB," claims are directed, without limitation, to other formats of storing, communicating, compressing and processing images, such as raw data, TIFF, HSV/HSL, GIF, CIE, RGB, YUV, H.264, and CMYK. Images may not be in color. Images may be or include infrared light bands, including near IR (e.g., 850 and 940 nm,) and far IR (e.g., temperature). Images may include false color. Images may be synthetic or have false color, such as from phased array radar or medical imaging equipment (e.g., ultrasound, x-ray, CAT scans, NMR scans, medical camera images for minimally invasive surgery, and the like). Images include both still images and video images.

The term, "FEV" stands for front eye view, which is the as the normal view from an RGB camera.

The term, "YOLO" stands for you only look once, which is a technique of doing "single pass" image recognition. See https://arxiv.org/abs/1506.02640 for more information.

Specifically claimed are the use of both a 2D image and a 3D data together, wherein a device comprises: a single focusing optics; a 2D imager; a 3D time-of-flight imager; a dichroic mirror positioned between the optics and the two imagers such that both imagers see the same scene as focused by the single, shared focusing optics; for the purpose of AI network training or object identification, or both, for convolution, fusing, and deconvolution.

Specifically claimed are the use of both a 2D image and 3D data together, wherein a device comprises: a single focusing optics; a 2D imager; a 3D time-of-flight sensor; a dichroic mirror positioned between the optics and the two imagers such that both imagers see the same scene as focused by the single, shared focusing optics; for the purpose of AI network training or object identification, or both, for generating an e-RGB images using adversarial loss.

Specifically claimed are the use of both a 2D image and 3D data together, wherein a device comprises: a single focusing optics; a 2D imager; a 3D time-of-flight imager; a dichroic mirror positioned between the optics and the two imagers such that both imagers see the same scene as focused by the single, shared focusing optics; for the purpose of AI network training or object identification, or both, for adaptive histogram equalization, or joint filtering of RGB and distance data.

Device Embodiments

Exemplary, non-limiting embodiments are described below.
1. A device comprising:
   a single focusing optics;
   a 2D imager;
   a 3D time-of-flight imager;
   a dichroic mirror positioned between the optics and the two imagers such that both imagers see the same scene as focused by the single, shared focusing optics.
2. The device of embodiment 1 further comprising:
   a data storage and processing module adapted to accept and store repetitive digital outputs of the 2D imager and the 3D imager, maintaining the time and spatial relationships between the images.
3. The device of embodiment 2 further comprising:
   an image enhancement module adapted to accept image pairs, a first 2D image and a corresponding first 3D dataset, from the data storage and processing modules, and then use information in the first 3D dataset to enhance the first 2D image, and adapted to output, store or further process the now enhanced first 2D image (e-RGB).
4. The device of embodiment 3 wherein:
   the enhancement by the image enhancement module comprises replacing pixels in a first object in the first 2D image with true reflectivity of the first object as determined by the corresponding region of the first 3D dataset, subject to a replacement criteria, generating the first enhanced 2D image (e-RGB).
5. The device of embodiment 4 wherein:
   the replacement criteria for each pixel or an image region comprises: when the true reflectivity from the first 3D dataset is greater than the apparent reflectivity in the first 2D image.
6. The device of embodiment 3 wherein:
   the enhancement by the image enhancement module comprises replacing selected pixels in a first region in the first 2D image, based on a true distance of the pixels in the first region.
7. The device of embodiment 6 wherein:
   the replacing selected pixels comprises replacing pixels with black when the true distance is greater than a threshold, where the threshold is set by the true distance of closer pixels in the first region.
8. The device of embodiment 3 wherein:
   the enhancement by the image enhancement module comprises setting a bounding box to include only pixels within a true distance range.
9. The device of embodiment 3 wherein:
   the enhancement by the image enhancement module comprises altering pixels whose true distance is greater than a predetermined threshold.
10. The device of embodiment 9 wherein:
    the altering of pixels comprises changing a color of the pixels to black (setting brightness to zero).
11. The device of embodiment 3 wherein:
    the enhancement by the image enhancement module reducing the size or altering the shape of one or more bounding boxes to exclude pixels outside of a true distance range.
12. The device of embodiment 3 further comprising:
    an image recognition module, where an input to the image recognition module is the e-RGB image and not the first 3D dataset.
13. The device of embodiment 12 further comprising:
    an object identification module comprising an AI algorithm pretrained with 2D, but not 3D, images.

Method Embodiments

Exemplary, non-limiting embodiments are described below.
1. A method of enhancing two-dimensional images comprising the steps:
   (a) Acquiring a pair of images at the same time, of the same scene, using a single focusing optical path, wherein a 3D dataset is acquired with a time-of-flight sensor and a 2D image is acquired by 2D image sensor, and the 3D dataset and the 2D make up the pair of images;
   (b) Using distance data, amplitude data, or both, from the 3D dataset to enhance selected portions of the 2D image by replacing or altering groups of pixels in the 2D image, generating an e-RGB image.
2. The method of embodiment 1 wherein:
   pixels within a first region within a first bounding box, in the 2D image, are replaced with corresponding amplitude pixels, from the 3D dataset, if the pixels in the 3D dataset are brighter than the original pixels in the 2D image, generating at least part of the e-RGB image.
3. The method of embodiment 1 wherein:
   a first bounding box in the 2D image is replaced with a second and a third bounding box when distance data for the corresponding first bounding box in the 3D dataset indicates that there are two distinct objects within the first bounding box, generating at least part of the e-RGB image.
4. The method of embodiment 1 wherein:
   a first portions in the 2D image are modified by changing color, brightness or alpha of pixels in the first portions when distance data from corresponding portions of the 3D dataset indicate that there is no reflective object within a range in those first regions, generating at least part of the e-RGB image.
5. The method of embodiment 1 comprising the additional step:
   (c) Passing the e-RGB image to a trained AI neural net, wherein the trained AI neural net was trained on non-e-RGB images.

6. The method of embodiment 1 comprising the additional step:
   (d) generating a composite bird's-eye view from the 3D dataset and the e-RGB image.

7. A method of analyzing a scene comprising the steps:
   (e) acquiring a pair of images at the same time, of the same scene, using a single focusing optical path, wherein a 3D dataset is acquired with a time-of-flight sensor and a 2D image is acquired by 2D image sensor, and the 3D dataset and the 2D make up the pair of images;
   (f) passing both the 2D image and the 3D dataset to an AI neural network as part of a training set.

8. A method of generating bounding boxes for object identification in an images comprising the steps:
   (g) acquiring a pair of images at the same time, of the same scene, using a single focusing optical path, wherein a 3D dataset is acquired with a time-of-flight sensor and a 2D image is acquired by 2D image sensor, and the 3D dataset and the 2D make up the pair of images;
   (h) using distance data, amplitude data, or both, from the 3D dataset to identify a region, groups of pixels, or objects wherein the distance of at least a majority of pixels in the region are at the same distance, within a distance bound, to create a first bounding box;
   (i) transferring the bounding box to the 2D image for the purpose of object identification in the 2D image.

System Embodiments

Systems for use in transit vehicles, vehicle-to-vehicle safety systems, accident avoidance, and autonomous vehicles are claimed. Systems for safety, security, surveillance, traffic analysis, signal control and crowd management are claimed. Systems may include computational hardware and algorithms for object detection and object identification. Pedestrian identification is a key embodiment and use of embodiments.

Systems incorporated into smart phones and similar portable devices equipped with both a 2D image sensor and a 3D data sensor are claimed.

Systems incorporating hardware as described elsewhere herein in one unit, and then transferring image data to a portable device such as a smart phone for processing, display, storage, compression, object detection, object recognition, AI networks and warning signals, in any combination, are claimed.

Definitions 2D images are represented, stored and communicated in an uncompressed format, such as TIFF, or in standard file forms such as JPEG, GIF, etc. We refer to either the data or the visible image as a "2D image," with the understanding that various meta data in a corresponding file may or may be within the meaning of "image," depending on context. Processing of image data may occur on the fly, or streamed. That is, as it is generated. It is typically not necessary for an entire image to me in memory at once before processing starts. For 3D, we generally refer to "3D data" or equivalently, "3D dataset," or equivalently, "3D point cloud," because viewable images require some kind of transform on the data. Also, there are far fewer standardized representations of 3D data. Nonetheless, we may refer to a "3D image" referring to either the 3D data or a derived 2D (i.e., viewable) image from the 3D data, as appropriate.

A "chip," "images sensor," and "imager" are similar terms. An imager may comprise more than one chip. A sensor may comprise elements in addition to a chip, such as filters. 3D data sensors are sometimes called "time-of-flight" sensors, chips or imagers. A 3D sensor may be called a 3D imager.

The term, "calibrated" needs to be construed widely. It may occur continually in real time, or occasionally, or only once. In some contexts, such calibration may have another name, such as "alignment" or "morphing."

Use of the word, "invention" means "embodiment," including in drawings.

Ideal, Ideally, Optimum and Preferred—Use of the words, "ideal," "ideally," "optimum," "optimum," "should" and "preferred," when used in the context of describing this invention, refer specifically to a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substitution thereof to any and all other device claims, including all combinations of elements in device claims.

We claim:

1. A device comprising:
   a single focusing optics;
   a 2D imager adapted to generate a 2D image digital dataset from a first scene;
   a 3D time-of-flight imager adapted to generate a 3D time-of-flight image digital dataset from the first scene;
   a dichroic mirror positioned between the 2D imager and the 3D time-of-flight imager such that both imagers see the first scene as focused by the single, shared focusing optics;
   circuitry adapted to accept and store a first sequence of 2D image digital datasets for sequential scenes and a first sequence of 3D time-of-flight image digital datasets for the same sequential scenes, while maintaining a time and spatial relationship between the respective images for each scene in the sequential scenes.

2. A device comprising:
a single focusing optics;
a 2D imager;
a 3D time-of-flight imager; and
a dichroic mirror positioned between the optics and the two imagers such that both imagers see the same scene as focused by the single, shared focusing optics;
circuitry adapted to accept image pairs, from a single scene at a single point in time, a first 2D image digital dataset and a corresponding first 3D time-of-flight image digital dataset, from the data storage and processing modules, and then use information in the first 3D time-of-flight image digital dataset to enhance the first 2D image digital dataset, and adapted to output, store or further process the now enhanced first 2D image digital dataset (e-RGB).

3. The device of claim 2 wherein:
the enhancement by the image enhancement module comprises replacing pixels in a first object in the first 2D image with true reflectivity of the first object as determined by the corresponding region of the first 3D dataset, subject to a replacement criteria, generating the first enhanced 2D image (e-RGB).

4. The device of claim 3 wherein:
the replacement criteria for each pixel or an image region comprises: when the true reflectivity from the first 3D dataset is greater than the apparent reflectivity in the first 2D image.

5. The device of claim 2 wherein:
the enhancement by the image enhancement module comprises replacing selected pixels in a first region in the first 2D image, based on a true distance of the pixels in the first region.

6. The device of claim 2 wherein:
the enhancement by the image enhancement module comprises setting a bounding box to include only pixels within a true distance range.

7. The device of claim 2 wherein:
the enhancement by the image enhancement module comprises altering pixels whose true distance is greater than a predetermined threshold.

8. The device of claim 7 wherein:
the altering of pixels comprises changing a color of the pixels to black (setting brightness to zero).

9. The device of claim 2 wherein:
the enhancement by the image enhancement module reducing the size or altering the shape of one or more bounding boxes to exclude pixels outside of a true distance range.

10. The device of claim 2 further comprising: an image recognition module, where an input to the image recognition module is pd.

11. The device of claim 10 further comprising:
an object identification module comprising an AI algorithm pretrained with 2D, but not 3D, images.

12. A method of enhancing two-dimensional images comprising the steps:
(a) acquiring a pair of images at the same time, of the same scene, using a single focusing optical path, wherein a 3D dataset is acquired with a time-of-flight sensor and a 2D image is acquired by 2D image sensor, and the 3D dataset and the 2D image make up the pair of images; and
(b) using distance data, amplitude data, or both, from the 3D dataset to enhance selected portions of the 2D image by replacing or altering groups of pixels in the 2D image, generating an e-RGB image;
wherein the single focusing optical path comprises a dichroic mirror positioned between the optics and the two imagers such that both the 2D image sensor and the time-of-flight sensor see the same scene as focused by the single, shared focusing optics.

13. The method of claim 12 wherein:
pixels within a first region within a first bounding box, in the 2D image, are replaced with corresponding amplitude pixels, from the 3D dataset, if the pixels in the 3D dataset are brighter than the original pixels in the 2D image, generating at least part of the e-RGB image.

14. The method of claim 12 wherein:
a first bounding box in the 2D image is replaced with a second and a third bounding box when distance data for the corresponding first bounding box in the 3D dataset indicates that there are two distinct objects within the first bounding box, generating at least part of the e-RGB image.

15. The method of claim 12 wherein:
a first portions in the 2D image are modified by changing color, brightness or alpha of pixels in the first portions when distance data from corresponding portions of the 3D dataset indicate that there is no reflective object within a range in those first regions, generating at least part of the e-RGB image.

16. The method of claim 12 comprising the additional step:
(c) passing the e-RGB image to a trained AI neural net, wherein the trained AI neural net was trained on non-e-RGB images.

17. The method of claim 12 comprising the additional step:
(c) generating a composite bird's-eye view from the 3D dataset and the e-RGB image.

18. A method of analyzing a scene comprising the steps:
(a) acquiring a pair of images at the same time, of the same scene, using a single focusing optical path, wherein a 3D dataset is acquired with a time-of-flight sensor and a 2D image is acquired by 2D image sensor, and the 3D dataset and the 2D image make up the pair of images;
(b) passing both the 2D image and the 3D dataset to an AI neural network as part of a training set;
wherein the single focusing optical path comprises a dichroic mirror positioned between the optics and the two imagers such that both the 2D image sensor and the time-of-flight sensor see the same scene as focused by the single, shared focusing optics.

19. A method of generating bounding boxes for object identification in an images comprising the steps:
(a) acquiring a pair of images at the same time, of the same scene, using a single focusing optical path, wherein a 3D dataset is acquired with a time-of-flight sensor and a 2D image is acquired by 2D image sensor, and the 3D dataset and the 2D image make up the pair of images;
(b) using distance data, amplitude data, or both, from the 3D dataset to identify a region, groups of pixels, or objects wherein the distance of at least a majority of pixels in the region are at the same distance, within a distance bound, to create a first bounding box; and
(c) transferring the bounding box to the 2D image for the purpose of object identification in the 2D image;
wherein the optical path comprises a dichroic mirror positioned between the optics and the two imagers such that both the 2D image sensor and the time-of-flight sensor see the same scene as focused by the single, shared focusing optics.

\* \* \* \* \*